United States Patent [19]

Bentley et al.

[11] 4,276,267

[45] Jun. 30, 1981

[54] HOT CELL PURIFICATION OF STRONTIUM-82, 85 AND OTHER ISOTOPES FROM PROTON IRRADIATED MOLYBDENUM

[75] Inventors: Glenn E. Bentley; John W. Barnes, both of Los Alamos, N. Mex.

[73] Assignee: The United States of America as represented by the United States Department of Energy, Washington, D.C.

[21] Appl. No.: 86,021

[22] Filed: Oct. 17, 1979

[51] Int. Cl.³ .......................... C01F 1/00; C01G 1/00; B01D 11/04; B01D 15/04

[52] U.S. Cl. .......................................... 423/2; 423/249

[58] Field of Search ...................... 423/2, 249, 70, 153, 423/181, 21.5; 210/37 R, 38 C, 38 R, 21

[56] References Cited

U.S. PATENT DOCUMENTS

| | | | |
|---|---|---|---|
| 3,010,788 | 11/1961 | Glueckauf | 423/2 |
| 3,122,414 | 2/1964 | Horner et al. . | |
| 3,153,566 | 10/1964 | Spector | 423/2 |
| 3,154,500 | 10/1964 | Jansen et al. . | |
| 3,173,757 | 3/1965 | Wheelwright et al. . | |
| 3,218,123 | 11/1965 | Davis et al. | 423/2 |
| 3,218,123 | 11/1965 | Davis et al. . | |
| 3,258,315 | 6/1966 | Schmitt . | |
| 3,287,084 | 11/1966 | Van Tuyl | 423/2 |
| 3,333,919 | 8/1967 | Buckingham | 423/2 |
| 3,343,914 | 9/1967 | Bray | 423/2 |
| 3,694,369 | 9/1972 | Orlandini . | |
| 3,953,567 | 4/1976 | Grant et al. | 423/2 |
| 3,957,945 | 5/1976 | Grant et al. . | |

FOREIGN PATENT DOCUMENTS

| | | | |
|---|---|---|---|
| 4226 | 9/1979 | European Pat. Off. | 423/2 |

OTHER PUBLICATIONS

Rengan, K. et al., *Radiochem. Radioanal. Lett.*, 24(1): 1-8, 1976.

*Primary Examiner*—Richard E. Schafer

*Attorney, Agent, or Firm*—Elizabeth O. Slade; Paul D. Gaetjens; James E. Denny

[57] ABSTRACT

A process suitable for producing curie quantities of quite pure Sr-82,85 is given. After a Mo target is irradiated with energetic protons having energies greater than about 200 MeV, thus producing a large number of radioactive species, the particular species of Sr-82,85 are substantially separated from the other products by a 6-step process. The process comprises dissolution of the target in $H_2O_2$, followed by use of several ion exchange resins, extraction with an organophosphorus compound, and several adjustments of pH values. Other embodiments include processes for producing relatively pure long-lived Rb isotopes, Y-88, and Zr-88.

11 Claims, 1 Drawing Figure

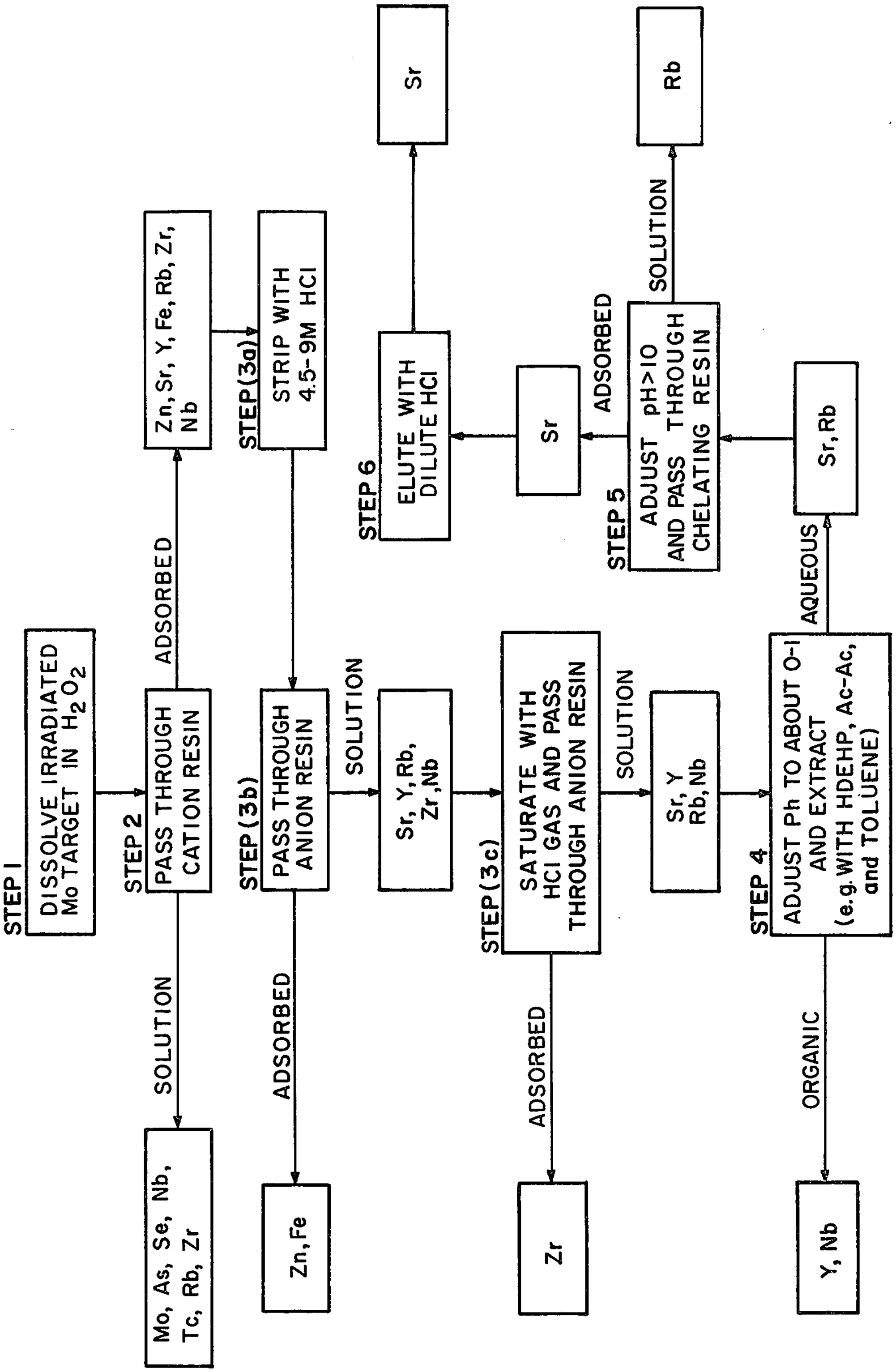
STEP I
DISSOLVE IRRADIATED Mo TARGET IN H2O2
STEP 2
PASS THROUGH CATION RESIN
SOLUTION
Mo, As, Se, Nb, Tc, Rb, Zr
ADSORBED
Zn, Sr, Y, Fe, Rb, Zr, Nb
STEP (3a)
STRIP WITH 4.5-9M HCl
STEP (3b)
PASS THROUGH ANION RESIN
ADSORBED
Zn, Fe
SOLUTION
Sr, Y, Rb, Zr, Nb
STEP (3c)
SATURATE WITH HCl GAS AND PASS THROUGH ANION RESIN
ADSORBED
Zr
SOLUTION
Sr, Y Rb, Nb
STEP 4
ADJUST Ph TO ABOUT O-I AND EXTRACT (e.g. WITH HDEHP, Ac-Ac, and TOLUENE)
ORGANIC
Y, Nb
AQUEOUS
Sr, Rb
STEP 5
ADJUST pH>IO AND PASS THROUGH CHELATING RESIN
SOLUTION
Rb
ADSORBED
Sr
STEP 6
ELUTE WITH DILUTE HCl
Sr

HOT CELL PURIFICATION OF STRONTIUM-82, 85 AND OTHER ISOTOPES FROM PROTON IRRADIATED MOLYBDENUM

BACKGROUND OF THE INVENTION

1. Field of the Invention

This invention relates generally to a method of producing and purifying a number of radioactive species from intermediate energy proton spallation reactions on molybdenum (Mo) targets and relates in particular to a method of producing and purifying curie quantities of strontium-82/85. It is a result of a contract with the Department of Energy (contract W-7405-ENG-36).

Strontium-82 (Sr-82) has a half-life of 25 days and decays by pure electron capture to the ground state of its 75-second daughter, rubidum-82. Rubidium-82 (Rb-82) in turn decays by 95% positron emission and 5% electron capture to stable krypton-82, exhibiting several prominent gamma rays. Because such short-lived alkali metal activity is available from a long-lived parent, the availability of Sr-82 is of significant interest for biomedical studies. The useful shelf-life is determined by the activity of Sr-82, while the very short half-life of Rb-82 keeps the radiation dose to the patient low. With a suitable positron imaging device, a system of generating Rb-82 has a considerable number of potential medical applications in cases where repeated, rapid, dynamic blood-flow information would be of value, for example, in investigation of coronary occlusion, cardiac output, arteriography, and tumor vascularity. Thus, because of the above-described uses, large quantities of Sr-82 are needed.

2. Prior Art

In U.S. Pat. No. 3,957,945, Grant et al., a method of producing and purifying Sr-82 obtained from an intermediate energy spallation reaction on a molybdenum target was provided in a 6-step radiochemical procedure. The 6-step combination process of Grant et al., however, has not been found to be suitable for producing large quantities of Sr-82 because the time and volumes involved in steps of that method expanded to unmanageable levels when a large scale operation was attempted.

In U.S. Pat. No. 3,122,414, Horner et al., and in U.S. Pat. No. 3,258,315, Schmitt, a liquid extraction step was used to separate Sr values from solutions such as fission product waste solutions. In U.S. Pat. No. 3,694,369, Orlandini, U.S. Pat. No. 3,218,123, Davis et al., U.S. Pat. No. 3,173,757, Wheelwright et al., and in U.S. Pat. No. 3,154,500, Jansen et al., ion exchange resins were used in various combination processes to perform separations of fission products, which included Sr values. However, in fission and spallation reactions, different starting materials are used and different products are obtained. Thus, because Sr-82,85 is not produced in a fission reaction but rather in a spallation reaction, none of these patents (excluding Grant) provides a method suitable for producing Sr-82,85 in any amount, much less in curie quantities.

Additionally, no prior art method is known which is suitable for producing in relatively pure form all four of the products Y-88, Zr-88, long-lived Rb, and Sr-82,85. And none of the combinations of steps (recited below) which are used in this invention to produce these four products have been known in the art.

Furthermore, the step of dissolution of an irradiated Mo target in $H_2O_2$ followed by passing the solution over even a single ion exchange resin has not previously been known.

3. Objects of the Invention

It was an object of this invention to produce large (curie) quantities of Sr-82,85 from proton irradiated molybdenum, with a minimum of manipulations and process time.

Further objects of this invention were to obtain curie quantities each of Zr-88, Y-88, and long lived Rb, each in relatively pure form.

Other objects, advantages and novel features of the invention will become apparent to those skilled in the art upon examination of the following detailed description of a preferred embodiment of the invention and the accompanying drawings.

SUMMARY OF THE INVENTION

According to the invention, a process suitable for the production of curie quantites of Sr-82,85 is:

1. Dissolution of irradiated target:

$$\text{Mo target} \xrightarrow{H_2O_2} \text{cations} + \text{anions} + \text{neutral species;}$$

2. Cation exchange to separate cations from neutral and anionic species;
3. Formation of anionic chlorocomplex species and removal thereof from solution by anion exchange;
4. Adjustment of pH to within the range from about 0 to about 1, followed by solvent extraction using at least one alkyl organophosphorus compound;
5. Removal of long-lived Rb from the aqueous solution by adjusting the pH to a value greater than 10 and then passing the solution over a chelating resin; and
6. Removal of Sr from resin by elution with dilute HCl.

Also, according to the invention, long-lived Rb-isotopes (including a mixture of Rb-83, 84, 86) are produced in relatively pure form in a process comprising steps 1 through 5 described above.

Further, according to the invention, Y-88 is produced in relatively pure form in a process comprising steps 1 through 4 described above.

Additionally, according to the invention, Zr-88 is produced in relatively pure form in a process comprising steps 1 through 3 described above.

BRIEF DESCRIPTION OF THE DRAWINGS

The drawing is a flow sheet showing the steps in the method of this invention for processing spallation-induced activities from a molybdenum target.

DESCRIPTION OF THE PREFERRED EMBODIMENTS

Although some individual steps of this process are similar to individual steps which have been known in the prior art, the 6-step combination process of this invention has not previously been known, nor has the combination of steps 1–5, of 1–4, nor of 1–3 been known. The process of this invention advantageously results in a large number of relatively pure radioactive species, including Sr-82,85 (Sr-82 being the generator parent of Rb-82), Rb-83, 84, and 86 (long-lived and useful in nuclear chemistry experiments), Y-88, (which is useful as a photoneutron source), and Zr-88 (which is useful as the parent for producing isotopically pure Y-88 for physics experiments). The process is amenable to the production of curie quantities of these materials and thus is of great importance for producing neutron deficient isotopes in the field of nuclear chemistry. Furthermore, the process time is quite short and the number of manipulations is quite small. Additionally, the Sr-82,85, Rb-83, 84, 86, Y-88, and Zr-88 isotopes which are obtained are concentrated within relatively small amounts of liquid. Ion exchange resins serve to concentrate the isotopes, thus reducing handling problems.

Although they are not shown on the flow sheet, the spallation products cobalt and manganese are to some extent carried along with Sr throughout the process and are to some extent split off from the Sr.

In a preliminary step, a molybdenum target is irradiated by energetic protons having energies which are greater than approximately 200 MeV, (i.e., the threshold energy required for production of spallation reactions), so as to produce a large number of isotopes by spallation reactions. Any method suitable for such irradiation which will produce quantities of Sr-82 from a molybdenum target is suitable for use in the method of this invention. In order to produce curie quantities of Sr-82, generally the Mo target will weigh at least about 100 g.

A suitable method of proton bombardment of the Mo target is to insert an experimental packet into a linear proton accelerator beam at some convenient position. The packet is then irradiated at an integrated beam intensity of about 30 to about 1,000 mA-hours (milliampere-hours). Each packet can consist of a number of metal foils sandwiched together, or the Mo can be thicker (generally less than about 0.8 inch). The target will be maintained at a constant position in the beam by an external holder.

After the step of irradiation of the molybdenum target, the target is allowed to decay to remove unwanted short-lived isotopes. This period of time will generally be from about 7 to about 14 days.

Step 1

Next, the irradiated molybdenum target containing the spallation products Mo, As, Se, Nb, Te, Mn, Co, Rb, Zn, Fe, Zr, Sr, Y, Rb, and Nb is dissolved in hydrogen peroxide. Although either a batch process or a continuous process can be used, the use of a batch process rather than a continuous process is definitely preferred because it results in a significant advantage: namely, the time required to dissolve the target is reduced from weeks to hours.

Although a 30 weight % solution of $H_2O_2$ was used to dissolve the target because it is the most concentrated solution which is commercially available, that concentration is not critical; and any available aqueous $H_2O_2$ solution can be used. In order to minimize the time of dissolution, however, one should use a relatively concentrated $H_2O_2$ solution (i.e., about 30 weight percent or greater). After the target is dissolved, the $H_2O_2$ concentration will generally be adjusted, particularly when one wishes to maximize the recovery of Zr in step 2, which follows. This adjusting is done by adding excess $H_2O_2$ so that the color of the solution changes from an orange color to a pale yellow.

Even if one uses protons having energies below or above the range used to bombard the Mo target in the example below, it is believed that the identity of the spallation products will not be significantly different from the list of spallation products given above. Rather, it is believed that only the production cross sections (i.e., percentages) of these products will vary, provided that the proton energies are high enough to produce a spallation reaction.

Step 2

The solution is then subjected to cation exchange so as to separate the cationic species from the dissolved target material, the neutral species, and the anionic species. Any suitable cation exchange resin can be used for this purpose. For example, a Bio-Rad AG-50-X4 strong acid resin, which can be purchased from Bio-Rad Corp., can be used. In this step, Zn, Sr, Y, Mn, Co, a portion of the Rb, a portion of the Zr, a portion of the Nb, and a small amount of Fe will be adsorbed on the cation resin, whereas the Mo, As, Se, Tc, and the remainder of the Nb, Rb, and Zr will not be absorbed from solution by the resin.

It is believed that this single step of passing such a $H_2O_2$ solution which includes Mo over a cation exchange resin is itself new.

Step 3

Chlorocomplexes of anionic species are formed and then removed from solution by anion exchange. A suitable procedure comprises the following three steps. (a) The cations (including Sr and Rb) are removed from the cation resin with HCl having a molarity within the range from about 4.5 to about 9 M. (b) Chlorocomplexes which form in the 4.5–9 M HCl are removed by passing the solution over a strong base ion exchange resin, (for example, a Bio-Rad AGl-X8). In this step, Zn and Fe will be adsorbed on the column, whereas the Sr, Y, Rb, Zr and Nb will be in solution. (c) The HCl solution is saturated with HCl gas and again passed over a strong base anion exchange resin to remove chlorocomplexes formed in the concentrated HCl. Thus, Zr will be adsorbed on the resin, whereas Sr, Y, Rb, and Nb will be in solution. The Zr can be removed by washing the column with 0.1–1 M HCl and can be used in any further process or for any use requiring relatively pure Zr-88.

In step (3c), the anion exchange resin that was used in step (3b) can be used, if desired. Alternatively, two separate strong base anion exchange resins can be used. Two will be used particularly if one wishes to separate Zr from Zn and Fe.

The degree of saturation of the solution with gaseous HCl is determined empirically by determining when the amount of gas bubbling out of the solution is approximately equal to the amount of gas bubbling into the solution.

Step 4

Next, the pH of the solution is adjusted by boiling the solution to dryness or near dryness and redissolving the residue either in water or in dilute HCl so that the pH of the resulting solution lies within the range from about 0 to about 1. Within this pH range, it has been found that solvent extraction with (1) at least one alkyl organophosphorus compound, for example bis(2-ethylhexyl) orthophosphoric acid (i.e., HDEHP), combined with extraction with (2) at least one compound selected from the group consisting of 2,4 pentanedione (i.e., Ac-Ac) and fluorinated derivatives thereof, and combined with (3) at least one aromatic-type solvent, for example toluene, leaves an aqueous solution consisting essentially of Sr and Rb activities.

The organophosphorus compound extracts the Y, Nb, and residual Zr; and thus it is required in the practice of the invention. And because the organophosphorus compound is quite viscous at room temperature, an aromatic solvent will generally be used in the extraction. The Ac-Ac (or derivative thereof) serves to extract any aluminum which was present in the Mo target as a contaminant. Because such Al is almost always present in Mo to some extent as an impurity, Ac-Ac (or derivative) will generally be used. However, if the Mo target were obtainable free from Al, Ac-Ac (or derivative) would not be required in the extraction.

Examples of organophosphorus compounds other than HDEHP which are expected to be suitable for use in Step 4 include but are not limited to tributyl phosphate and trioctyl phosphine oxide. Other than Ac-Ac, suitable fluorinated derivatives thereof include (but are not limited to) tri- and hexafluorinated derivatives. And other than toluene, suitable aromatic-type solvents include (but are not limited to) benzene and xylene.

The extraction can be done by using a mixture of at least one organophosphorus compound, Ac-Ac (or derivative), and aromatic solvent; or, alternatively, it can be done in successive steps by extracting first with the alkyl organophosphorus compound in aromatic solvent and second with the Ac-Ac (or derivative). The relative amounts of these three components can vary quite broadly. However, it has been found that when HDEHP, Ac-Ac, and toluene were used with volume ratios of HDEHP:Ac-Ac:toluene of 1:1:1, an excellent separation (further described below in the Example) was obtained. In the organic layer, Y and Nb are left in relatively pure form. The $^{88}$Y may be removed from the solvent with 6 M HCl and used for any purpose requiring Y-88 in relatively pure form, for example the purpose of Y-88 cited above.

Step 5

Next, the Rb is separated from the Sr by adjusting the pH to a value greater than 10 and then passing that solution over a chelating resin which selectively adsorbs the Sr but not the Rb. Any suitable resin for carrying out this purpose can be used. An example is a mixed bed Biorex 70/Chelex-100 column. Finally the resin is preferably washed with a small amount of water, thus removing any remaining Rb. The Rb so obtained can be used as a source of relatively pure long-lived Rb in any process or for any use requiring such Rb.

Step 6

Finally, purified Sr is removed from the chelating resin by eluting the resin with dilute hydrochloric acid having a molarity within the range from about 0.5 to about 2 M. The amount of dilute HCl used is an amount sufficient to remove essentially all gamma activity from the column. The thus-purified Sr can be used as a source of relatively pure Sr-82 in any process or use requiring such material.

EXAMPLE

A massive (450 g) molybdenum target, which had been spectrochemically assayed to be at least 99.9% pure, was irradiated with 600–800 MeV protons at an integrated beam intensity of 1.2 A-hours. This produced approximately 100 curies at induced gamma activity, measured at the end of bombardment plus 10 days. Of this activity, it was determined by gamma ray spectroscopy that approximately 20 curies were due to Sr-82 plus Sr-85 (the ratio of the activity of Sr-82 to Sr-85 being equal to 0.73). Other species which were present with activities greater than 1 curie included Se-75; As-73; Br-82; Rb-82 m, 83, 84; Y-87, 88; Zr-88, 89; Nb-85, 91 m, 92 m, Mo-99; and Tc-95, 96, and 99 m.

The irradiated molybdenum target was dissolved batchwise (100 ml per batch) in 9.3 liters of unstabilized 30% $H_2O_2$. Excess $H_2O_2$ was added until the color of the solution changed from orange to pale yellow. The solution was then passed through a cation exchange resin which was a Bio-Rad AGl-50X4 strong acid resin. The cations remained on the column. Thereafter, 1 liter of 6 M HCl was passed over the column to remove adsorbed cations. Anionic chlorocomplexes formed in the 6 M HCl were removed with a Bio-Rad AGl-X8 strong base anion resin. The solution was saturated with HCl gas by bubbling HCl through the solution until it appeared that the amount of gas entering the solution equaled the amount leaving the solution. Chlorocomplexes of anionic species which formed were removed by passing the solution again over the same strong base anion exchange resin (the Bio-Rad AGl-X8).

Next, the solution was evaporated to near dryness and the pH of the solution was adjusted to 0–1 by adding 0.1 M HCl. The solution was then solvent extracted with 50 ml of a solution containing 33 volume % HDEHP, 33 volume % 2, 4 pentanedione, and 33 volume % toluene. The aqueous layer contained the Sr and Rb activities and was separated from the organic layer.

Next, the pH of the aqueous solution containing the Sr and Rb was adjusted to >10 by adding 50 weight % aqueous NaoH, and was then passed over a mixed bed Biorex 70/Chelex-100 column. A small amount (about 25 ml) of water was used to wash the column, thus removing any remaining Rb.

Strontium was then removed from the chelating resin by eluting the column with sufficient (i.e., about 50–100 milliliters of) 0.5 M HCl so that essentially all gamma activity was removed from the column.

The amount of purified Sr recovered by the steps described above was approximately 3 curies (corrected for decay).

Using the above-described separation steps, Sr can be obtained in relatively pure form. A measure of the purity of Sr with respect to a particular contaminating isotope is given by the decontamination factor $K_{df}$, which is defined as $$K_{df} = \left[ \frac{R_o}{R_1} \right],$$

$$\text{where } R_o = \left[ \frac{A_o n}{A_o 82_{Sr}} \right]_{original},$$

$$R_1 = \left[ \frac{A_o n}{A_o 82_{Sr}} \right]_{final},$$

The quantity $A_o n$ is the activity at time $t_o$ of a contaminating isotope, and $A_o{}^{82}Sr$ is the activity at time $t_o$ of $^{82}$Sr. For a particular element, its decontamination factor is a measure of how effectively that element was removed with respect to Sr-82 present in the original solution being purified. In Table I are given the experimentally obtained decontamination factor values for various isotopes which were produced in addition to Sr-82 in the spallation reaction.

TABLE I

| Element | $K_{DF}$ |
|---|---|
| Mn | 3 |
| Co | 8 |
| Zn | $>10^5$ |
| As | $>10^5$ |
| Se | $>10^5$ |
| Rb | 114 |
| Y | 3000 |

TABLE I-continued

| Element | $K_{DF}$ |
|---|---|
| Zr | $>10^5$ |
| Nb | $>10^5$ |
| Tc | $>10^5$ |

These values indicate that Sr-82 was separated extremely well from Zn, As, Se, Zr, Nb, and Tc and that it was separated quite well from Rb and Y. And although the separation of Sr-82 from Mn and Co was not as good as the other separations given in Table I, this fact is not a significant problem because Mn and Co do not contribute much to the radioactivity. The mixture of Sr-82, Co, and Mn can be shipped to users; and the decay product Rb-82 can readily be separated from parent Sr-82, from Co, and from Mn by use of a chelating resin, as used in Step 5, described above.

The foregoing description of a preferred embodiment of the invention has been presented for purposes of illustration and description and is not intended to be exhaustive or to limit the invention to the precise form disclosed. It was chose and described in order to best explain the principles of the invention and their practical application to thereby enable others skilled in the art to best utilize the invention in various embodiments and with various modifications as are suited to the particular use contemplated. It is intended that the scope of the invention be defined by the claims appended hereto.

We claim:

1. A process for producing and purifying strontium-82, said process comprising:

a. dissolving in an $H_2O_2$ solution a molybdenum target which had been irradiated by energetic protons having energies greater than about 200 MeV, so as to form a first solution;

b. passing said first solution over a cation exchange resin, so as to form a first adsorbed fraction and a second solution;

c. forming chlorocomplexes of anions found in said first adsorbed fraction and removing said chlorocomplexes from solution by anion exchange, thus forming at least one second adsorbed fraction and a third solution;

d. adjusting the pH of said third solution so that it lies within the range from about 0 to about 1 and extracting said third solution with (1) at least one alkyl organophosphorus compound, (2) at least one second compound selected from the group consisting of 2,4-pentanedione and fluorinated derivatives thereof, and (3) at least one aromatic solvent, thus forming an aqueous fraction and an organic fraction;

e. adjusting the pH of said aqueous fraction so that it is greater than 10 and then passing said aqueous fraction through a chelating resin, thus forming a third adsorbed fraction and a fourth solution; and f. eluting said chelating resin with a first hydrochloric acid solution having a molarity within the range from about 0.5 to about 2.0 M, so as to form a fifth solution comprising strontium-82.

2. A method according to claim 1, wherein said chlorocomplexes of anions found in said first adsorbed fraction are formed by:

a. stripping said cation exchange resin with a second hydrochloric acid solution having a molarity within the range from about 4.5 to about 9 M so as to form a stripped solution, b. then passing said stripped solution through a first anion exchange resin, so as to form a sixth solution and a first adsorbed anion fraction; and c. saturating said sixth solution with HCl gas and then passing said sixth solution through an anion exchange resin, thus forming a second adsorbed anion fraction and said third solution.

3. A method according to claim 2, wherein said at least one alkyl organophosphorus compound comprises bis (2-ethylhexyl) orthophosphoric acid, wherein said at least one second compound comprises 2,4-pentanedione, and wherein said at least one aromatic solvent comprises toluene.

4. A method according to claim 3, wherein said energetic protons have energies which lie within the range from about 600 to about 800 MeV, wherein said molybdenum target weighs at least about 100 g, and wherein said $H_2O_2$ has a concentration at of at least about 30 wt % $H_2O_2$.

5. A method according to claim 4, wherein said first hydrochloric acid solution has a molarity of about 0.5 M and wherein said second hydrochloric acid solution has a molarity of about 6 M.

6. A method according to claims 1 or 2, including removing said fourth solution and recovering long-lived rubidium therefrom.

7. A method according to claims 1 or 2 including recovering yttrium-88 from said organic fraction.

8. A method according to claim 2 including recovering zirconium 88 from said second adsorbed anion fraction.

9. A process for producing and purifying long-lived rubidium, said process comprising:

a. dissolving in an $H_2O_2$ solution a molybdenum target which had been irradiated by energetic protons having energies greater than about 200 MeV, so as to form a first solution;

b. passing said first solution over a cation exchange resin, so as to form a first adsorbed fraction and a second solution;

c. forming chlorocomplexes of anions found in said first adsorbed fraction and removing said chlorocomplexes from solution by anion exchange, thus forming at least one second adsorbed fraction and a third solution;

d. adjusting the pH of said third solution so that it lies within the range from about 0 to about 1 and extracting said third solution with (1) at least one alkyl organophosphorus compound, (2) at least one second compound selected from the group consisting of 2,4-pentanedione and fluorinated derivatives thereof and (3) at least one aromatic solvent, thus forming an aqueous fraction and an organic fraction;

e. adjusting the pH of said aqueous fraction so that it is greater than 10 and then passing said aqueous fraction through a chelating resin, thus forming a third adsorbed fraction and a fourth solution comprising long-lived rubidium.

10. A process for producing and purifying yttrium-88, said process comprising:

a. dissolving in an $H_2O_2$ solution a molybdenum target which had been irradiated by energetic protons having energies greater than about 200 MeV, so as to form a first solution;

b. passing said first solution over a cation exchange resin, so as to form a first adsorbed fraction and a second solution;

c. forming chlorocomplexes of anions found in said first adsorbed fraction and removing said chlorocomplexes from solution by anion exchange, thus forming at least one second adsorbed fraction and a third solution;

d. adjusting the pH of said third solution so that it lies within the range from about 0 to about 1 and extracting said third solution with (1) at least one alkyl organophosphorus compound, (2) at least one second compound selected from the group consisting of 2,4-pentanedione and fluorinated derivatives thereof, and (3) at least one aromatic solvent, thus forming an aqueous fraction and an organic fraction which comprises yttrium-88.

11. A method of producing and purifying zirconium-88, said method comprising:

a. dissolving in an $H_2O_2$ solution a molybdenum target which had been irradiated by energetic protons having energies greater than about 200 MeV, so as to form a first solution;

b. passing said first solution over a cation exchange resin, so as to form a first adsorbed fraction and a second solution;

c. forming chlorocomplexes of anions found in said first adsorbed fraction by (1) stripping said cation exchange resin with hydrochloric acid having a molarity within the range from about 4.5 to about 9 molar so as to form a stripped solution, (2) passing said stripped solution through a first anion exchange resin so as to form a further solution and a first adsorbed anion fraction, and (3) saturating said fourth solution with HCl gas and passing said further solution through an anion exchange resin, thus forming a second adsorbed anion fraction comprising zirconium-88.

* * * * *

UNITED STATES PATENT OFFICE
CERTIFICATE OF CORRECTION

Patent No. 4,276,267 Dated June 30, 1981

Inventor(s) Glenn E. Bentley and John W. Barnes

It is certified that error appears in the above-identified patent and that said Letters Patent are hereby corrected as shown below:

-- Claim 11, line 14, delete "fourth" and substitute therefor -- further --.

Signed and Sealed this

***Second* Day of *February 1982***

[SEAL]

*Attest:*

GERALD J. MOSSINGHOFF

*Attesting Officer* *Commissioner of Patents and Trademarks*